United States Patent [19]
Franck

[11] 3,762,682
[45] Oct. 2, 1973

[54] VALVE

[75] Inventor: Donald L. Franck, Vandalia, Ohio

[73] Assignee: General Motors Corporation, Detroit, Mich.

[22] Filed: Nov. 18, 1971

[21] Appl. No.: 199,927

[52] U.S. Cl. ................. 251/124, 251/315, 251/209
[51] Int. Cl. ........................... F16k 5/10, F16k 5/06
[58] Field of Search .................... 251/124, 315, 209

[56] References Cited
UNITED STATES PATENTS

| | | |
|---|---|---|
| 3,542,338 | 11/1970 | Scaramucci .................. 251/315 X |
| 1,406,191 | 2/1922 | Irving ............................ 251/124 |
| 3,542,337 | 11/1970 | Scaramucci .................. 251/315 X |

Primary Examiner—Henry T. Klinksiek
Attorney—Peter P. Kozak et al.

[57] ABSTRACT

A precision fluid control ball valve including a ball having an opening therethrough with a circular opening at its outlet end cooperating with a circular outlet valve housing port to provide for a variable outlet opening between valve open and valve closed positions and with the ball opening being progressively larger from its outlet to its inlet end so that the inlet end is fully open to the inlet valve housing port for all positions of the valve between its fully open and fully closed positions to provide for linear or laminar fluid flow through the valve for all said positions.

3 Claims, 4 Drawing Figures

INVENTOR.
Donald L. Franck
BY
Peter P. Kozak
ATTORNEY

VALVE

This invention relates to precision fluid control valves and more particularly to a valve for controlling the pressure of relatively viscous fluids flowing through a conduit.

The manufacture of urethane foams, for example, involves supplying two or more reactive components in accurately metered proportions to a mixing device from whence the mixed components are deposited in a suitable mold wherein the mixture reacts to produce the polyurethane foam.

These components are relatively viscous and usually contain solid fillers and solid impurities and are desirably maintained in constant circulation through a closed loop leading from and returning to the component supply tank. A suitable supply conduit connected to the loop feeds the component to the mixing device at a predetermined pressure. The fluid pressure is generated by a suitable pump located in the loop between the supply tank and the supply conduit and is controlled by a control valve located in the loop between the supply conduit and the supply tank.

In the manufacture of polyurethane foams, the ability to control the loop pressures is an important requirement since the maintenance of a set pressure consistently in the loop is necessary for metering component outputs correctly.

A primary function of the control or throttle valve in any processing loop as above described is to create a restriction which in turn controls the back pressure existing between the pump and the valve. Given the same flow rate, the component or material velocity through the valve must vary as the passage diameter or dimension therethrough changes. Sensitivity, fouling and consistency of pressure are dependent on the smoothness of the material velocity transition through the valve. Abrupt restrictions, characteristic of throttling valves in general, promote turbulent flow and uneven pressure conditions.

It is the principal object of this invention to provide a control or throttling valve which is simple in construction and permits smooth linear or laminar passage of material therethrough whereby uneven pressures due to abrupt restrictions and turbulent material flow are avoided.

A further object of the invention is to provide a control or throttling valve through which smooth linear or laminar flow is accomplished, which is essentially non-fouling, which minimizes pressure losses caused by valve and valve orifice configurations and which is essentially free of deterioration in efficiency and effectiveness due to corrosion caused by corrosive component ingredients such as toluene diisocyanate in urethane precursor components.

Another object of this invention is to provide a throttling valve construction having the above advantages which may be made by a relatively simple modification of a standard ball valve.

These and other objects are accomplished by the provision of a precision fluid control ball valve including a ball having an opening therethrough with an inlet end and an outlet end which is rotatably disposed in a housing having an inlet port and an outlet port. The inlet end of the ball opening is circular and is movable with respect to the circular housing outlet port so that the outlet opening of the valve may be infinitely varied between a fully open and a fully closed position. The outlet end of the ball opening is sufficiently larger so that the inlet to the ball opening is fully open for all settings of the valve between the fully open and fully closed positions and the ball opening progressively increases in dimensions preferably in funnel-like fashion from the outlet end to the inlet end so that the fluid flows substantially linearly through the valve for all settings of the valve between its fully open and fully closed positions and whereby a laminar flow profile through the valve is established.

Other objects and advantages will be apparent from the following detailed description reference being had to the accompanying drawings in which.

Figure 1:
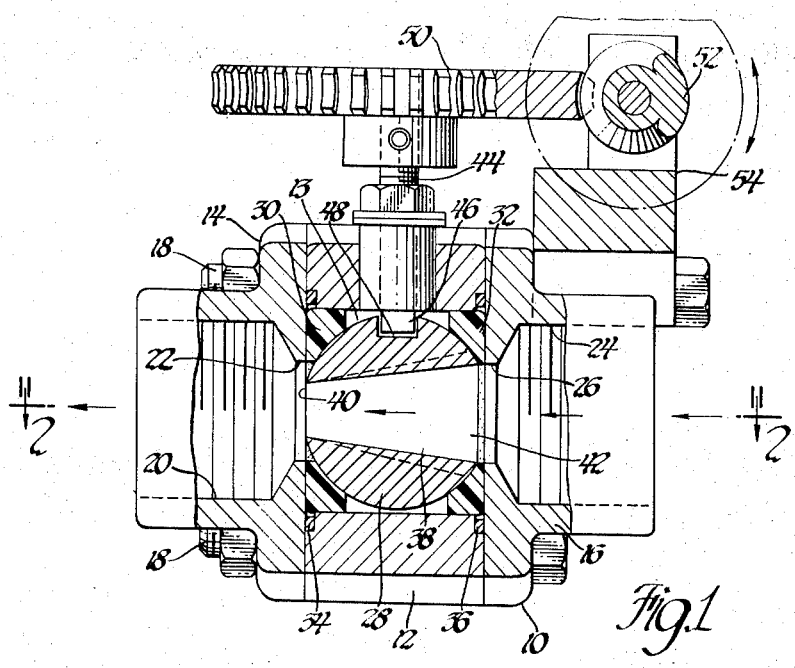
FIG. 1 is a cross-sectional elevation view of the ball control valve of this invention.
Figure 2:
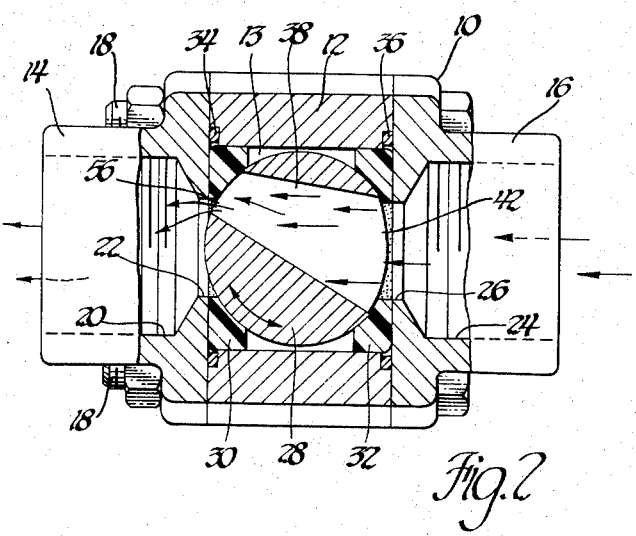
FIG. 2 is a cross-sectional view taken along line 2—2 of FIG. 1 with the ball rotated.

Referring now to FIGS. 1 and 2 of the drawings the valve of this invention comprises a generally rectangular housing 10 of more or less standard construction and including the main body portion 12, having a cylindrical cavity 13 therein, the outlet fitting 14 and the inlet fitting 16 all held together by four bolts 18 located generally at the four corners of the valve housing.

The outlet fitting 14 is provided with a threaded opening 20 for receiving a threaded outlet conduit or pipe which reduces in diameter to a circular outlet port 22. Similarly, the inlet fitting 16 is provided with a threaded opening 24 for receiving a threaded inlet conduit or pipe which reduces in diameter to a circular inlet port 26.

Interposed within the cavity 13 between the outlet fitting 14 and the inlet fitting 16 is a ball 28 supported by the annular outlet seal ring 30 and the annular inlet seal ring 32 each preferably formed of polytetrafluoroethylene or similar material having good sealing and antifriction properties. The internal diameter of the outlet seal ring 30 is preferably equal to the diameter of the outlet port 22 and similarly the internal diameter of the inlet seal ring 32 is preferably equal to the diameter of the inlet port 26 so that in each instance the seal rings form a portion of the adjacent ports. The portion of each seal ring adjacent the ball are partially spherical and snugly engage the ball 28. Gaskets 34 and 36 between the outlet fitting 14 and the main body portion 12 and between the inlet fitting 16 and the main body portion 12 respectively provide a leak free valve. As is apparent from FIGS. 1 and 2 the seal rings 30 and 32 are held locked within the main body portion 12 and in snug sealing engagement with the ball 28 by the outlet and inlet fittings respectively.

An essential feature of the valve of this invention is the provision of a funnel-like opening 38 substantially centrally through the ball 28 having preferably a circular outlet end or orifice 40 which is progressively larger toward the inlet end 42. The ball 28 is rotatably positioned in the valve housing so that the longitudinal axis of the opening 38 may be aligned with the longitudinal axis through the valve ports 22 and 26 to locate the ball in a fully open position as shown in FIG. 1. In this position the outlet orifice of the ball opening is in alignment with and completely open to the outlet port 22 of the valve housing as shown.

A stem 44 having an arcuate tip 46 received in an arc slot 48 of the ball 28 is rotatably mounted in the housing portion 12 perpendicularly with respect to the aforementioned valve port axis and perpendicularly to the ball opening 38 axis so that a rotation of the stem 44 is operative to move the outlet end 40 into and out of alignment with the outlet port 22. For precision adjustment the stem 44 is rigidly connected to a gear 50 in meshed relationship with a worm gear 52 mounted on a bracket 54 supported by one of the bolts 18. A handle (not shown) is attached to the worm gear 52 for manual rotation of the valve ball 28.

As is apparent from FIG. 1 rotation of the worm gear 52 is operative to move the valve ball from a fully open position as shown and described above to a closed position when the ball opening outlet port 40 is fully out of alignment with the outlet port 22. FIG. 2 shows the ball partially out of alignment to provide the relatively small restricted opening 56 while the ball inlet opening 42 is fully open. It will be noted that fluid flow through ball and valve ports is linear or laminar in the fully open position of FIG. 1 as well as the nearly closed position of FIG. 2. Since the ball opening 38 is of a funnel-like configuration the flow of the fluid from the inlet end to the outlet end of the ball is smooth and non-turbulent. With the inlet end 42 of the ball being open to the inlet port 26 in all positions of the ball between a fully open and fully closed position of the valve and with the opening 38 having a funnel-like configuration, fluid flow through the valve is smooth and non-turbulent for all operating positions of the valve.

Figure 3:
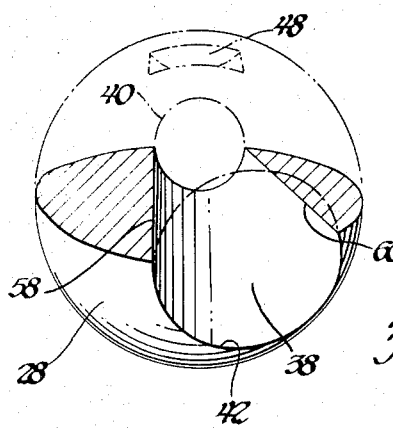
FIG. 3 is a perspective view in cross-section of one embodiment of a ball with portions shown in phantom lines as shown in FIGS. 1 and 2.

FIG. 3 shows in perspective the embodiment of the ball 28 shown in FIGS. 1 and 2. The opening 38 may be conceived as having originally been a cylindrical opening with the diameter of the outlet end 40 and with the wall dimension 58 being parallel to an axis passing through the center of the outlet end 40 and centrally of the ball. The opening is then enlarged so as to retain the dimension 58 and to progressively enlarge the opening from the outlet opening 40 in a conical fashion with the dimension 60 opposite the dimension 58 diverging from the cylindrical configuration so as to provide the enlarged inlet end 42 of suitable size. This irregular conical configuration is preferred to provide a ball having sufficient spherical surface to be suitably supported by the seal rings 30 and 32. Depending on the size of the ball opening 38 required other configurations may be employed such as a regular cone about the ball opening axis.

Figure 4:
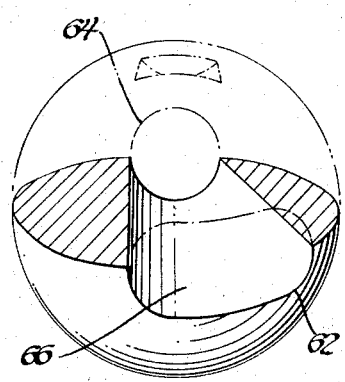
FIG. 4 is a perspective view in cross-section of another embodiment of a ball with portions shown in phantom lines in accordance with this invention.

The ball embodiment shown in perspective in FIG. 4 is similar to that shown in FIG. 3 except that the inlet end 62 of the opening has an elongated configuration with its small diameter equal to the diameter of the outlet end 64 and the opening 66 is similarly shaped in the form of a flattened funnel. Both these embodiments may readily be formed by modifying standard ball valve elements having an opening centrally thereof by drilling or otherwise removing portions of the ball to form openings as described.

The ball valve of this invention when used in the loop of a urethane foam system for containing urethane foam precursor components is operative to hold pressures consistent and maintain fluid output to the required 1 percent accuracy. Maintenance is reduced to less than 10 percent and the need for pressure adjustment has been reduced to less than 5 percent compared to experience with needle type valves. The valve holds a constant set-pressure, has a good sensitivity and response and is essentially non-fouling.

Although the invention has been described in terms of specific embodiments it will be obvious to those skilled in the art that other modifications may be made within the scope of this invention.

What is claimed is:

1. A precision fluid control ball valve comprising
   a valve housing having an inlet port and an outlet port aligned in spaced relation along an axis and of substantially equal diameter,
   a ball having a funnel-shaped opening therethrough having an inlet end and an outlet end sealingly and rotatably supported between said inlet and outlet ports, said opening being progressively larger from said outlet end to said inlet end said inlet end being larger than said inlet port,
   means for rotating said ball between a fully open position when said outlet end is fully aligned with said outlet port and a fully closed position when said outlet end is fully out of alignment with said outlet port, said inlet end being sufficiently larger than said inlet port so that said inlet end is fully open to said inlet port in all positions of said ball between said fully open and said fully closed positions so that the fluid may pass through said valve substantially linearly for all positions of said ball between said fully open and fully closed positions.

2. A precision fluid control valve comprising
   a valve housing having an inlet port and an outlet port of substantially equal diameter aligned in spaced relation along a first axis,
   an annular seal bearing adjacent said inlet port and an annular seal bearing adjacent said outlet port in spaced relation within said housing along said first axis,
   a ball having a funnel-shaped opening therethrough having an inlet end and an outlet end rotatable and sealingly supported between said seal bearings,
   a stem rotatably mounted in said housing and connected to said ball operative to rotate said ball about a second axis perpendicular to said first axis,
   said ball opening being disposed on a third axis perpendicular to said second axis and said ball being rotatable between a fully open position when said ball opening axis is in alignment with said first axis and a fully closed position when said opening outlet end is moved entirely out of alignment with the outlet port,
   said ball opening being progressively larger from said outlet end to said inlet end with said inlet end being sufficiently larger than said inlet port so that said inlet end is substantially fully open to said inlet port when said ball is rotated between said fully open position and said closed position.

3. The valve of claim 2 wherein said inlet end of said opening is generally elliptical and one wall of said opening is substantially parallel to said third axis and the opposite wall thereof is oblique thereto.

* * * * *